United States Patent [19]

Imam et al.

[11] Patent Number: 4,751,657

[45] Date of Patent: Jun. 14, 1988

[54] METHOD AND APPARATUS FOR DETECTING AXIAL CRACKS IN ROTORS FOR ROTATING MACHINERY

[75] Inventors: Imdad Imam, Schenectady; Horst G. DeLorenzi, Scotia, both of N.Y.

[73] Assignee: General Electric Company, Schenectady, N.Y.

[21] Appl. No.: 752,883

[22] Filed: Jul. 8, 1985

[51] Int. Cl.[4] .............................................. G01M 7/00
[52] U.S. Cl. .................................... 364/508; 364/507; 364/552; 73/577
[58] Field of Search ....................... 364/507, 508, 552; 73/577, 579, 581, 583, 587, 593, 659, 660, 597, 598, 600, 602, 799

[56] References Cited

U.S. PATENT DOCUMENTS

| | | | |
|---|---|---|---|
| 3,713,127 | 1/1973 | Keledy et al. | 73/587 |
| 4,007,630 | 2/1977 | Noda | 73/593 |
| 4,380,172 | 4/1983 | Imam et al. | 364/507 |
| 4,408,294 | 10/1983 | Imam | 364/507 |
| 4,635,210 | 1/1987 | Shiohata et al. | 364/508 |

OTHER PUBLICATIONS

"Crack Propagation Testing Machine Using Shimadzu Servopulser Dynatec", Fujimoto et al., Shimadzu Corp., Kyoto, Japan, Jun. 11, 1979, pp. 43–48.
"Load Fatigue Testing: State of the Art Survey", S. R. Swanson, Materials Research & Standards, Apr. 1963, pp. 11–44.

Primary Examiner—Parshotam S. Lall
Assistant Examiner—V. N. Trans
Attorney, Agent, or Firm—William H. Steinberg; James C. Davis, Jr.; Paul R. Webb, II

[57] ABSTRACT

Axial cracks in the rotor assembly of a variety of rotating machinery are detected while the rotor is being rotated, by sensing mechanical vibrations of the rotor at a location along the length thereof to produce a corresponding rotor vibration signal. A background vibration signal representing the vibration response at an earlier time is provided, as well as a monitor vibration signal representing the vibration response of the rotor at the time the monitor signal is obtained. A speed-dependent first harmonic difference signal is found by vectorially subtracting the first harmonic of the background vibration signal from the first harmonic of the monitor vibration signal. The relationship between the amplitude of the difference signal and the rotational speed of the rotor is then determined for rotational speeds away from the speed at which vibrational resonance occurs, with a relationship wherein the difference signal is proportional to the fourth power of the rotational speed being indicative of the presence of an axial crack in the rotor assembly. Histogram techniques improve the signal-to-noise ratio of the background vibration signal and of the monitor vibration signal. The vibration response of the rotor assembly at rotational speeds near the resonance speed may be utilized in conjunction with the response at speeds away from the resonance speed, in order to confirm the presence of a rotor crack.

27 Claims, 9 Drawing Sheets

METHOD AND APPARATUS FOR DETECTING AXIAL CRACKS IN ROTORS FOR ROTATING MACHINERY

BACKGROUND OF THE INVENTION

This invention relates to the detection of axial cracks in the rotatable portion of a machine assembly. More particularly, it relates to a method for detecting such cracks while the rotor is in operation.

The rotor assembly employed in many rotating machinery applications is frequently subjected to relatively severe mechanical and thermal stresses due to any number of fairly routine operating conditions. While the rotors employed in these applications are generally designed to withstand such stresses, cracks can still develop in the rotor under certain circumstances. In most applications, a cracked rotor must be replaced or repaired to protect the equipment from further damage and to ensure continued efficient operation of the machinery. Furthermore, in some applications, a cracked rotor poses a safety hazard to personnel operating equipment. For such high speed rotating machinery as aircraft engines, for example, a cracked rotor may lead to a catastrophic failure.

However, the development and growth of a crack in the rotor portion of such rotating machinery is not at all predictable. In some extreme cases, undetected cracks in the rotor have become large enough to cause the rotor to burst in a brittle fracture mode. For such critical applications as aircraft engines, the rotor must be inspected relatively frequently in order to prevent a catastrophic failure. Inspecting the rotor-disc components of an aircraft engine using the techniques currently employed requires disassembling and reassembling the engine each time the rotor is inspected. Such a procedure is obviously costly and time-consuming. Furthermore, while these periodic inspections provide an assessment of the condition of the rotor assembly at the time the inspection is performed, there is always the risk that a crack might initiate and grow between inspections.

A number of non-destructive techniques are known in the art to detect the presence and growth of a rotor crack. These techniques include surface inspection methods, such as magnetic particle testing, eddy current testing, and dye penetrant techniques, and also include volumetric methods, such as ultrasonic testing. However, none of these techniques can be used to inspect the rotor while it is in operation. Vibration signature analysis may also be used to detect rotor cracks, and has offered some relief from the need to bring the rotor to a complete stop. However, until recently, this technique was useful only when the rotor was decelerated to nearly zero rotational velocity.

U.S. Pat. No. 4,380,172, issued Apr. 19, 1983 to I. Imam et al., and assigned to instant assignee discloses and claims an on-line vibration signal analysis method of crack detection which eliminates the need to decelerate the rotating machinery. In the method disclosed by that patent, the rotor is tested while operating at normal speed and load conditions, by transitorily perturbing the rotor so that any crack present manifests itself by producing a new and different vibration response mode. U.S. Pat. No. 4,408,294, issued Oct. 4, 1983, to I. Imam, and also assigned to the instant assignee, also discloses and claims a method for detecting rotor cracks by utilizing vibration signature analysis. In the method disclosed by that patent, vibration signature analysis is performed on a set of difference signals obtained using histogram techniques, while the rotor is operating under normal conditions.

The methods disclosed by both of the above-referenced patents employ a change in the bending stiffness of the rotor, as the rotor is rotated, to detect the presence of a crack. For "transverse" cracks, that is, cracks which are contained in a plane which is generally perpendicular to the central axis of the rotor, the development and growth of the crack produces a measurable change in the bending stiffness of the rotor. This stiffness change can be detected by the vibration signature analysis techniques disclosed by the above-referenced patents, and can be employed to indicate the presence and size of a crack in the rotor. However, for some types of rotating machinery, such as aircraft engines and the like, most of the rotor cracks are "axial" cracks. As defined herein, an "axial" crack is a crack which is contained in a plane which is generally parallel to the central axis of the rotor. Thus, the term "axial crack" includes, for example, radial-axial cracks, that is, cracks which extend in a direction generally parallel to the central axis of the rotor and which have a depth in a direction which is generally perpendicular to that axis, and also includes circumferential-axial cracks, that is, cracks which extend generally in a circumferential direction which respect to the central axis of the rotor and which have a depth in a direction which is generally parallel to that axis. For these axial cracks, changes in the bending stiffness of the rotor as it is rotated are less pronounced. The present invention provides a method and apparatus for detecting these axial cracks by utilizing the relationship between the additional unbalance force created by such cracks and the rotational speed of the rotor.

Accordingly, it is an object of the present invention to provide a method and apparatus for detecting axial cracks in the rotor assembly of rotating machinery, while the machinery is in operation.

It is another object of the present invention to provide for on-line continuous monitoring of the machinery, for early detecting of cracks in the rotor.

It is a further object of the present invention to provide detection of axial rotor cracks utilizing vibration signature analysis techniques.

SUMMARY OF THE INVENTION

In accordance with one aspect of the present invention, a method for detecting axial cracks in the rotor portion of rotating machinery, while the rotor is being rotated, comprises sensing mechanical vibrations of the rotor at at least one location along the length thereof to produce a corresponding rotor vibration signal. A background vibration signal which serves as a baseline is provided, by either sensing the vibration response of the rotor as a function of rotational speed or by determining the residual unbalance in the rotor assembly by sensing mechanical vibrations of the rotor at rotational speeds below the speed at which axial cracks in the rotor open, and then calculating the background vibration signal by increasing the residual unbalance as a function of the second power of the rotational speed. A monitor vibration signal, which represents the vibration response of the rotor at the time the monitor signal is obtained, is also provided, and a speed-dependent difference signal is found by subtracting the background vibration signal from the monitor vibration signal. The relationship between the amplitude of the difference signal and the rotational speed of the rotor is then determined for rotational speeds different from the speed at which vibrational resonance occurs, with a relationship in which the difference signal is proportional to the fourth power of the rotational speed being indicative of the presence of an axial crack in the rotor. The mechanical vibrations may be sensed at a plurality of rotor locations to produce a corresponding plurality of vibration signals. To improve the signal-to-noise ratio of the background vibration signal and the monitor vibration signal, histogram techniques may be utilized to synchronously sum the respective signals over a number of time periods, using a reference signal indicative of rotor position. Furthermore, the vibration response of the rotor assembly at rotational speeds near the speed at which vibrational resonance occurs may be utilized in conjunction with the steps described above to confirm the presence of an axial crack in the rotor.

In accordance with another aspect of the present invention, apparatus for detecting axial rotor cracks comprises at least one vibration sensor disposed so as to sense mechanical vibrations of the rotor at at least one location thereof, and so as to produce at least one rotor vibration signal in response to the sensed mechanical vibrations. The apparatus includes means for providing at least one background vibration signal which represents the vibration response of the rotor which serves as a baseline, and means for processing the rotor vibration signal from the vibration sensor so as to provide a monitor vibration signal which represents the vibration response of the rotor at the time the monitor signal is obtained. The apparatus also comprises means for subtracting the background vibration signal from the monitor vibration signal, and means for determining the relationship between the resulting difference signal and the rotational speed of the rotor, so as to indicate the presence of an axial crack in the rotor when the difference signal is proportional to the fourth power of the rotational speed.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

DETAILED DESCRIPTION OF THE PREFERRED EMBODIMENTS

Figure 1:
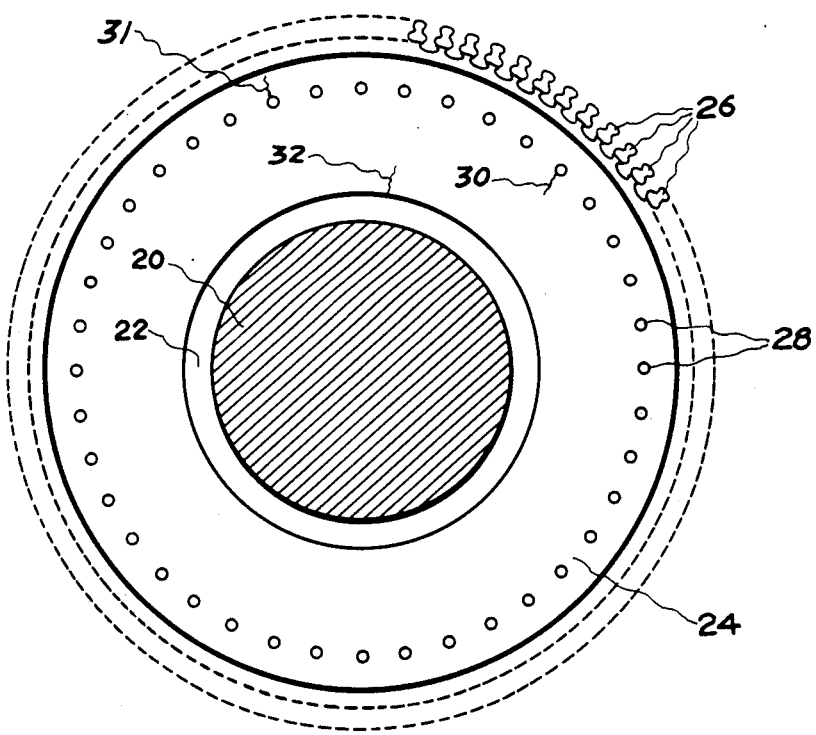
FIG. 1 is an end view in partial cross-section schematically illustrating a turbine rotor-disc assembly of the type typically employed in aircraft engines, for which the present invention may be utilized to detect axial cracks in the rotor assembly.

When an axial crack develops in a rotor-disc assembly, the crack opens during rotation of the rotor assembly, due to tensile hoop stresses, for the case of a radial-axial crack or due to tensile radial stresses, for the case of a circumferential-axial crack, in the material surrounding the crack. These tensile hoop and radial stresses are caused by centrifugal loading. Opening of the crack in this manner produces a change in the distribution of the mass of the rotor-disc assembly. The change in mass distribution, in turn, results in an additional unbalance force in the rotating rotor assembly. The present invention utilizes the relationship between the magnitude of this additional unbalance force and the rotational speed of the rotor to detect and monitor axial cracks in the rotor assembly.

The centrifugal unbalance force F is related to the mass distribution of the rotor assembly by the expression $$F=(m\omega^2)/r,$$

where m represents a finite unbalanced mass, $\omega$ represents the rotational speed at which mass m is being rotated, and r represents the radius of rotation of mass m. Accordingly, the change in centrifugal unbalance force $\Delta F$ due to a change in the mass distribution $\Delta m$ may be written as $$\Delta F=(\Delta m\ \omega^2)/r.$$

For an axial crack, the change in mass distribution $\Delta m$ is due to opening of the crack during rotation of the rotor assembly. As noted above, opening of rotor crack during rotation is, in turn, due to either the tensile hoop stresses or the tensile radial stresses resulting from centrifugal loading of the material surrounding the crack. Therefore, the crack opening area is proportional to the square of the rotational speed of the rotor. Since the change in mass distribution $\Delta m$ is proportional to the crack opening area, the change in mass distribution is also proportional to the square of the rotational speed of the rotor. Furthermore, since the additional unbalance force $\Delta F$ is proportional to the product of the change in mass distribution $\Delta m$ and the second power of the rotational speed, and since $\Delta m$ is itself proportional to the second power of the rotational speed, the additional unbalance force due to an axial crack in the rotor assembly is proportional to the fourth power of the rotational speed of the rotor assembly. Thus, for rotational speeds away from the speed at which vibrational resonance occurs in the rotor assembly, that is, speeds significantly below or above the resonance speed, the difference between the first harmonic vibration responses and the rotational speed of the rotor provides an unambiguous indication of the presence of an axial crack in the rotor assembly. Such a crack is the only flaw for which the difference in vibration responses is proportional to the fourth power of the rotational speed. For other defects, such as, for example, breakage of air foils attached to the rotor assembly, the additional unbalance force, and, concomitantly, the difference in first harmonic vibration responses between cracked and uncracked rotor assemblies, is proportional to the second power of the rotational speed.

As defined herein, the first harmonic vibration response of the rotor assembly refers to the amplitude of the vibration signal in the frequency domain, that is, at the speed of rotation of the rotor. When the rotor vibration response is analyzed using conventional spectrum analysis techniques, which techniques are often referred to as "Fourier Analysis" or "Signature Analysis", the vibration signal is separated into its harmonic constituent frequencies, and is presented in the frequency domain as opposed to the somewhat more conventional time domain presentation. The resulting frequency domain response appears as a signal having amplitude components located at frequency of rotation of the rotor and higher harmonics thereof. These signal components are often referred to as the first harmonic, second harmonic, third harmonic, etc., vibration responses. The first harmonic vibration response typically reflects both the background vibration due to residual unbalance and some other effects such as flaws other than cracks in the rotor assembly, and the additional vibration due to opening of a crack in the rotor assembly. Accordingly, the difference between the first harmonic vibration response of monitored and background rotor assemblies signals is used in the present invention to detect an axial crack in the rotor.

The crack detection of the present invention may be used in a number of applications, including, for example, acceptance testing of a rotor assembly, periodic inspection thereof, and in-service monitoring to detect the initiation of an axial crack in the rotor assembly. Furthermore, the present invention may be employed for detecting rotor cracks in a wide variety of rotating machinery. One particularly useful application is for detecting rotor cracks in aircraft engines. Accordingly, the discussion hereinbelow is directed to embodiments of the present invention which are especially useful for detecting radidal-axial and circumferential-axial cracks in the rotor assemblies of aircraft engines. However, it should be understood that the invention is not limited to such applications, but rather may be employed to detect cracks in the rotor assembly of virtually any rotating machinery for which the crack to be detected exhibits opening of the crack during rotation of the rotor, due to centrifugal loading effects, and which produces rotational unbalance in the rotor assembly.

Figure 2:
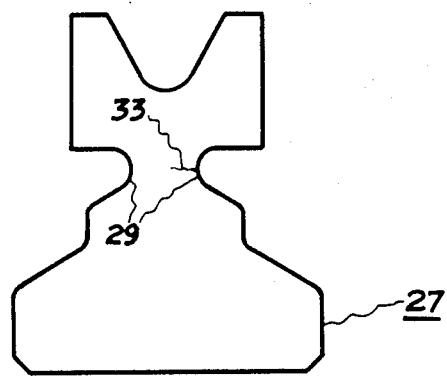
FIG. 2 is a representational view schematically illustrating a circumferential axial crack in a disc.

Most aircraft engine rotor cracks are of the radial-axial or circumferential-axial type, frequently originating at the bolt holes used to attach various sections of the rotor assembly together. Axial cracks also often form in the surface of the rotor disc which defines the bore for the rotor shaft, and in the notches of the blade attachment assemblies used to attach such structures as, for example, fan, turbine, and compressor blades to the rotor assembly. FIG. 1 schematically illustrates the type of rotor assembly typically employed in aircraft engines. Rotor disc 24 is typically attached to rotor shaft 20 by disc attaching means 22. Disc 24 contains a plurality of fastener openings 28 circumferentially arranged in a spaced-apart relationship about the central axis of disc 24. A plurality of blade attachment assemblies 26 is located around the entire outer circumference of disc 24, with blade attachment assemblies 26 being disposed so that the appropriate engine blades may be inserted into the notches or grooves between adjacent pairs of blade attachment assemblies 26, during assembly of the engine. In most aircraft engines, a number of rotor assembly sections are attached to each other by fasteners (not shown in FIG. 1) inserted through fastener openings 28 of each disc 24 of the assembly section. Cracks 30, 31 and 32 illustrate the types of radial-axial cracks that typically form in the rotor-disc assemblies of aircraft engines, at the fastener opening and at the bore of the rotor disc, respectively. FIG. 2 schematically illustrates a spin test disc. Crack 33 in notch 29 of disc 27 illustrates the type of circumferential-axial crack that typically develops in such disc assemblies. Although four axial cracks are shown in FIGS. 1 and 2 for the purpose of illustrating different types and orientations for the crack, the present invention may be used to detect any number of any type of the cracks shown. Furthermore, although not specifically shown in FIGS. 1 and 2, axial cracks in the blade sections or in the rotor may also be detected by the present invention.

Figure 3:
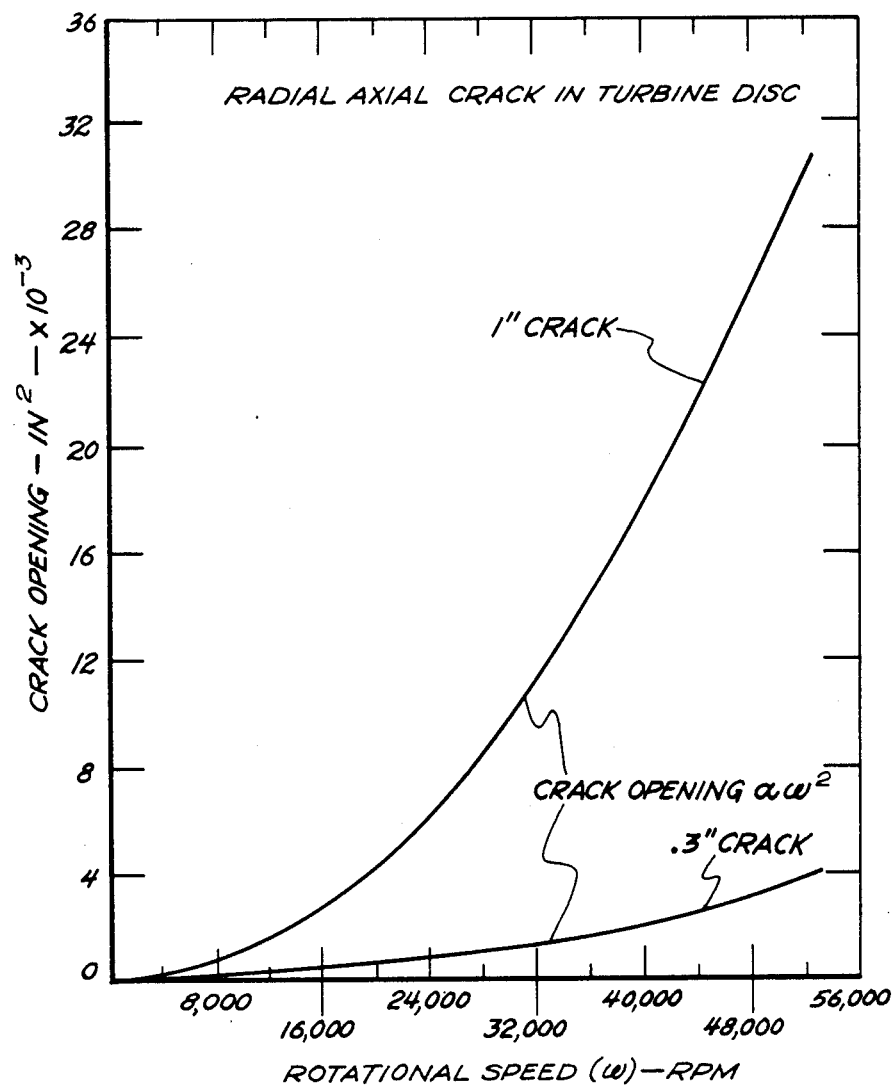
FIG. 3 graphically illustrates the dependence on rotational speed of the crack opening area for a radial-axial crack in the type of rotor-disc assembly illustrated in FIG. 1.

The present inventors have performed parametric studies, using finite element analysis, of the turbine rotor-disc assembly for an aircraft engine similar in structure to the rotor-disc assembly illustrated in FIG. 1. The ADINA TM finite element analysis program, available for ADINA Engineering, Inc., 71 Elton Ave., Watertown, Mass., was used to evaluate the crack opening area of several radial-axial cracks. Each crack was configured so as to be contained in a radial-axial plane, with the crack extending throughout the thickness of the rotor disc in a direction parallel to the central axis of the rotor assembly, and for a preselected distance in a direction perpendicular to the central axis of the rotor assembly. Each crack was assumed to originate at one of fastener openings 28 shown in FIG. 1. Different finite element meshes were used for each crack, to account for the differences in crack size. During the analysis, appropriate values of effective blade mass were added to the outer periphery of the turbine disc. The analysis was performed for rotational speeds of 50%, 75% and 100% of the full operational speed of the rotor, for each crack size, the crack opening area was calculated at each of the three rotational speeds. In calculating the crack opening areas, the effect of.expansion of fastener opening 28 during rotation of the rotor assembly was accounted for. The results of this analysis are illustrated in FIG. 3, where the crack opening area is plotted as a function of rotational speed for cracks having a length, in the direction perpendicular to the central axis of the rotor disc, of 0.3 inches and 1.0 inches, respectively. As can be seen from FIG. 3, the crack opening area is proportional to the second power of the rotational speed $\omega$.

Figure 4:
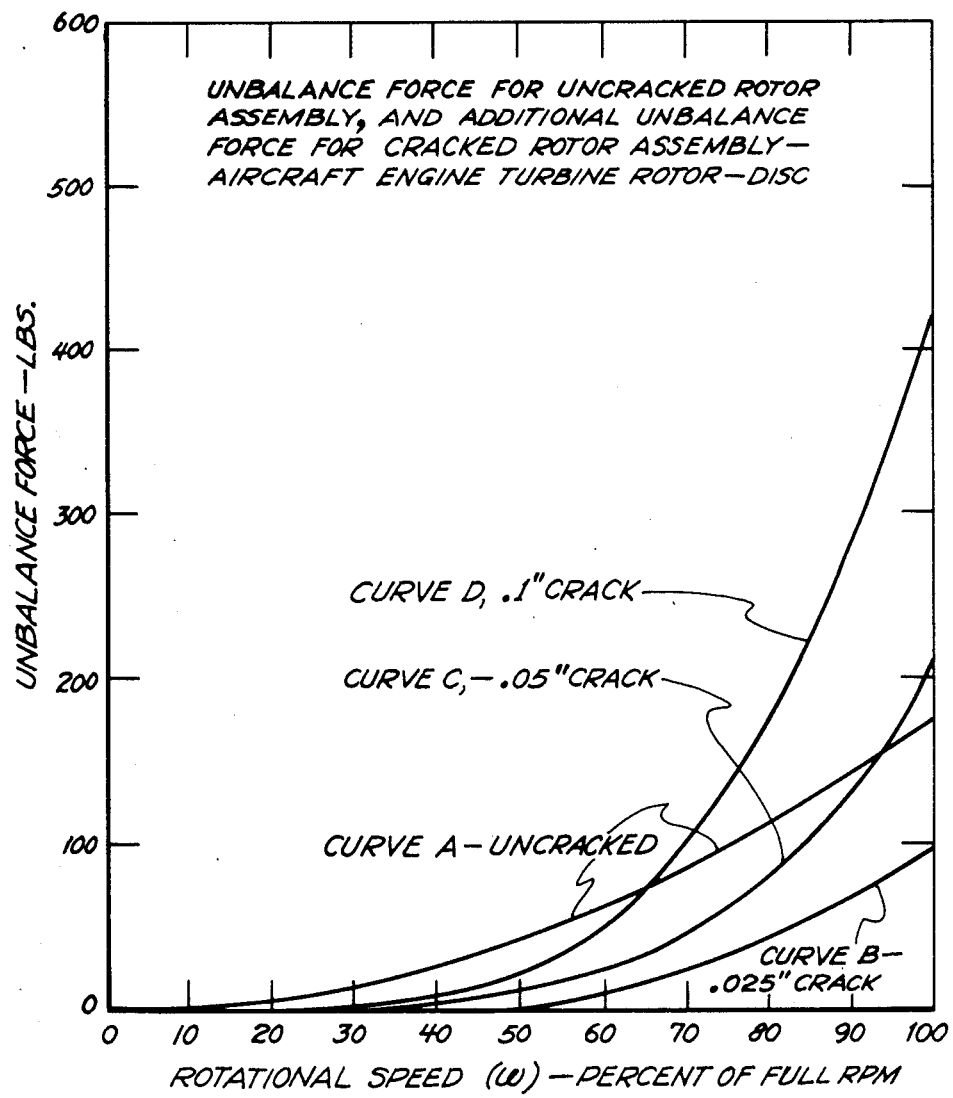
FIG. 4 graphically illustrates the dependence on rotational speed of the unbalance force in the type of rotor assembly shown in FIG. 1, for rotor assemblies having both cracked and uncracked rotor discs.

Using a similar analysis technique, the additional unbalance force due to a radial-axial crack in the turbine disc was also calculated for various crack sizes. Cracks having lengths, in the directional perpendicular to the central axis of the rotor disc, of 0.025 inches, 0.05 inches, and 0.1 inches were chosen. The results of these calculations are illustrated in FIG. 4. Curve A of FIG. 4 is a plot of the residual unbalance force, as a function of rotational speed, obtained for a typical uncracked rotor assembly. Curves B, C and D are plots of the additional unbalance force in the rotor assembly due to a radial-axial crack in the turbine disc, as a function of rotational speed, for crack sizes of 0.025 inches, 0.05 inches, and 0.10 inches, respectively. As can be seen from FIG. 4, the residual unbalance force is proportional to the second power of rotational speed, whereas the additional unbalance force due to a crack is proportional to the fourth power of rotational speed.

Figure 5:
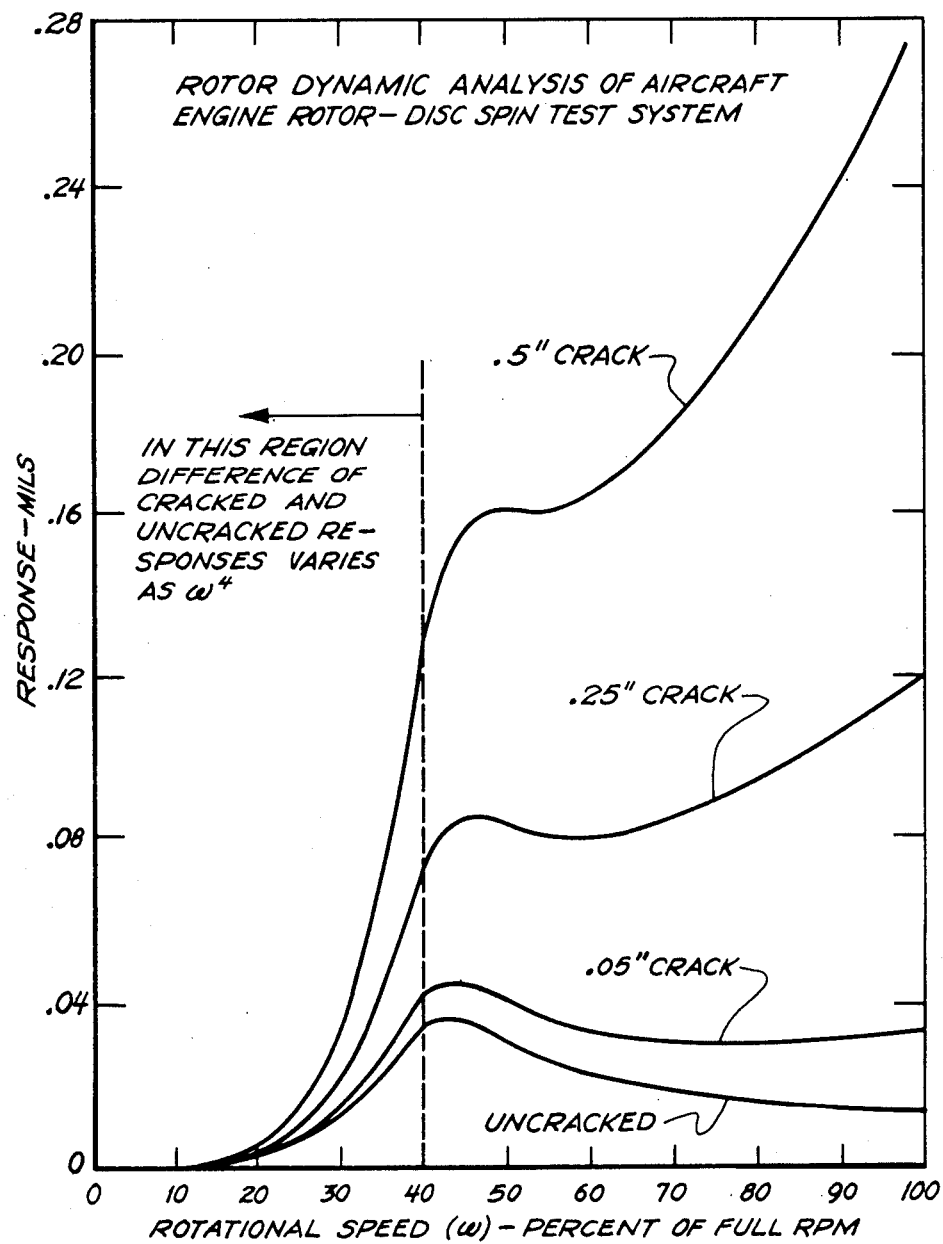
FIG. 5 graphically illustrates the analytical results of a dynamic analysis of an aircraft engine rotor-disc spin test system, for both cracked and uncracked rotor discs, according to the present invention.

A spin test system was also analyzed using finite element analysis techniques. A one-mass model was used for the analysis. Calculations similar to those described above were performed, and the vibration response of the system as a function of rotational speed was determined. The results are illustrated in FIG. 5, where the vibration responses are plotted for both a typical uncracked rotor disc and for rotor discs having crack sizes therein of 0.05 inches, 0.25 inches and 0.50 inches, respectively. FIG. 5 shows that, for rotational speeds away from the speed at which vibrational resonance occurs in the rotor assembly, the vibration response is dominated by the effect of the additional unbalance force in the rotor assembly due to the change in mass distribution caused by opening of the radial-axial crack during rotation. Accordingly, at speeds away from the resonance speed, the vibration response is also proportional to the fourth power of rotational speed. For speeds near the speed at which resonance occurs, the effect of vibrational resonance somewhat complicates the relationship between the vibration response and the rotational speed of the rotor assembly. However, the vibration response of the system for rotational speeds near the resonance speed may also be utilized to indicate the presence of a rotor crack. It can be seen from FIG. 5 that, as an axial rotor crack develops and grows in size, the plot of vibration response versus rotational speed shifts dramatically upwardly, from a curve having a shape very similar to the curve for an uncracked rotor assembly, to a curve which is significantly different from the curve for the uncracked rotor assembly. In the absence of a crack, such a shift in the system response over a period of time does not occur. Thus, the shift in system response illustrated in FIG. 5 may be employed to confirm the presence of a rotor crack.

Figure 6:
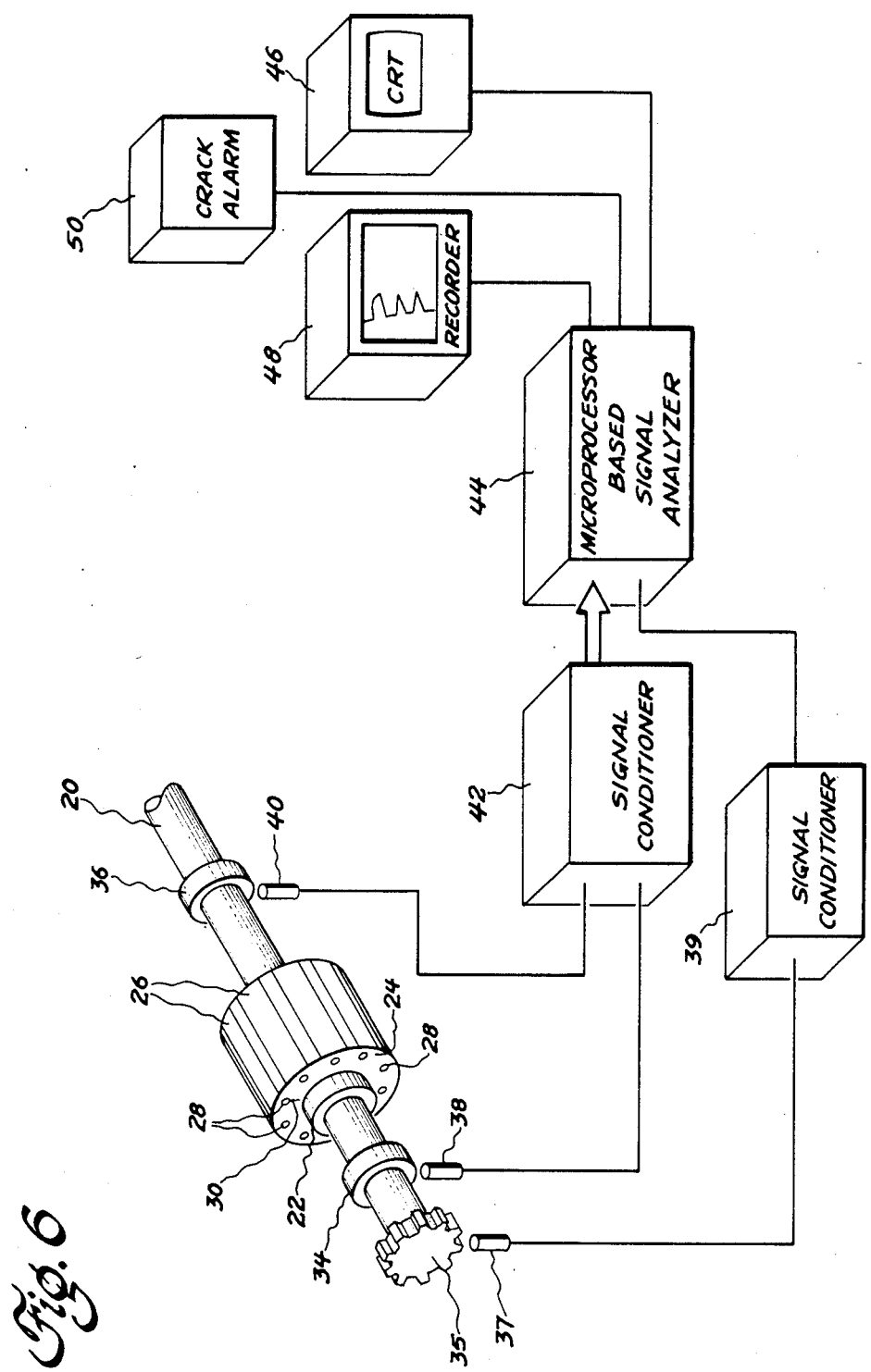
FIG. 6 is a simplified schematic illustration of a rotor assembly and of apparatus for detecting axial cracks in the rotor assembly, in accordance with present invention.

FIG. 6 schematically illustrates a turbine rotor-disc assembly, of the type shown in FIG. 1, and one embodiment of apparatus for detecting axial cracks therein, in accordance with the present invention. Only those elements of a rotor assembly essential to an understanding of the invention are shown in FIG. 6. For example, when the rotor assembly is employed in an aircraft engine, it should be understood that several rotor-disc sections of the type shown are fastened together, and that the entire assembly is encased within one or more outer shells. The rotor assembly illustrated in FIG. 6 is comprised of rotor shaft 20, turbine disc 24, and turbine blade attachment assemblies 26. Turbine disc 24 is attached to rotor shaft 20 by disc attaching means 22. Turbine blade attachment assemblies 26 are disposed so that turbine blades (not shown in FIG. 6) may be inserted into the grooves between adjacent pairs of blade attachment assemblies 26, during assembly of the engine. In an assembled engine, the rotor-disc section shown is fastened to similarly configured rotor-disc sections by means of fasteners (not shown) inserted through fastener openings 28 of turbine disc 24. Rotor shaft 20, turbine disc 24, and turbine blade attachment assemblies 26 rotate as a unit while being supported by bearings 34 and 36. Radial-axial crack 30, originating at one of fastener openings 28, is shown to illustrate the type of crack that typically forms in such rotor assemblies.

Vibrations in rotor shaft 20 are detected by vibration sensors 38 and 40. Vibration sensors 38 and 40 are disposed so as to sense mechanical vibrations of rotor shaft 20 and so as to provide electrical signals corresponding to the sensed mechanical vibrations. Additional sensors can be used so that horizontal and vertical vibration can be detected. Vibration sensors 38 and 40 may comprise, for example, displacement velocity or accelerometer devices of this type well known in the art. Vibration sensors 38 and 40 are electrically connected to signal conditioner 42. Signal conditioner 42 provides excitation to vibration sensors 38 and 40 and receives the resulting time-dependent vibration signals from them. Signal conditioner 42 also provides amplification and filtering of the received signals, as necessary. The use of more than one vibration sensor, in the manner illustrated in FIG. 6, ensures a sensitive response to a small crack. To correlate the vibration responses with angular position of the rotor assembly, angular velocity information is derived from the combination of tooth wheel 35 mounted on rotor shaft 20, and magnetic pickup 37. Signal conditioner 39 includes means for processing the signal from magnetic pickup 37 so that the angular velocity signal is in a form suitable for processing by signal analyzer 44. For example, in one embodiment, the signal from pickup 37 is conditioned to provide a fixed number of pulses per revolution of the rotor assembly. Signal analyzer 44 includes means for processing each input vibration signal separately on a near real-time basis. Each vibration signal is broken into a number of signal segments, with the total time encompassed by all of the signal segments being equal to one time segment. Preferably, each time segment corresponds to one revolution of the rotor assembly. The corresponding signal segments from each of a relatively large integral number of time segments are consecutively collected for each vibration signal, and are synchronously summed together by superposition, so as to provide an enhanced vibration signal for each of the input vibration signals. As an example, the signal segments from 500 time segments may be collected and summed together. The summing process magnifies the repetitive components of each vibration signal, but removes random noise components therefrom, since random noise components are summed substantially to zero. In effect, the noise components are integrated out of the summed signal.

The summing and superposition process may be accomplished in any number of ways known in the art, using conventional signal processing components. In one embodiment, each vibration signal is broken into signal segments by sampling the vibration signal at discrete time intervals. For example, the sampling intervals may be chosen to be a predetermined number of degrees apart for each revolution of the rotor assembly. All sampled values may be stored in memory so that all corresponding data points may be summed together to create an enhanced vibration signal. The collection and summing process may be terminated after a predetermined number of rotor revolutions, and the resulting enhanced vibration signal may itself be stored in memory for later recall.

Each conditioned vibration signal from signal conditioner 42 is presented to microprocessor-based signal analyzer 44. Signal analyzer 44 processes the conditioned vibration signals in accordance with the method of the present invention, in order to detect the presence of an axial crack in the rotor assembly, such as, for example, radial-axial crack 30 in disc 24 illustrated in FIG. 6. Signal analyzer 44 is capable of processing each conditioned vibration signal separately. However, with the high speed signal processing techniques currently available, each signal is analyzed substantially concurrently with the others and virtually on a real-time basis. Signal analyzer 44 includes means for providing a background vibration signal which represents the vibration response, as a function of rotational speed, of the rotor assembly at an earlier time. In one embodiment, the background vibration signal is provided by means for processing the conditioned vibration signals from sensors 38 and 40 so as to sense the vibration response, as a function of rotational speed, of the rotor assembly. In an alternative embodiment, the background vibration signal is provided by first determining the magnitude and phase of the residual unbalance in the rotor assembly, by sensing the mechanical vibrations of the rotor assembly at rotational speeds below the speed at which the crack opening area of an axial crack in the rotor assembly increases. For speeds below the speed at which the crack opens, the unbalance force in the rotor assembly is substantially the same as the unbalance force for an uncracked rotor assembly. The residual unbalance force at higher rotational speeds may then be approximated by increasing the measured residual unbalance force as a function of the second power of rotational speed. Using this relationship, the background vibration signal of the rotor assembly may be calculated from the residual unbalance force, as a function of rotational speed.

Signal analyzer 44 also includes means for providing at least one monitor vibration signal while the rotor assembly is in operation, which signal represents a vibration response, as a function of rotational speed, of the rotor assembly at the time the monitor signal is obtained. Conditioned vibration signals from sensors 38 and 40 are utilized and processed by signal analyzer 44 to provide the monitor vibration signal. Signal analyzer 44 further includes means for vectorially subtracting the magnitude and phase of the background vibration signal described above from the corresponding components of the monitor vibration signal, so as to provide a speed-dependent first harmonic difference signal. The relationship between the amplitude of the speed-dependent difference signal and the rotational speed of the rotor assembly is then determined by signal processing means included in signal analyzer 44, for rotational speeds away from the speed at which vibrational resonance occurs in the rotor assembly. A relationship in which the first harmonic difference signal is proportional to the fourth power of the rotational speed is indicative of the presence of an axial crack in the rotor assembly. Alternatively, the difference between the monitored and background vibration signals can be determined in the time domain and the first harmonic of the difference signal can be taken.

Figure 7:
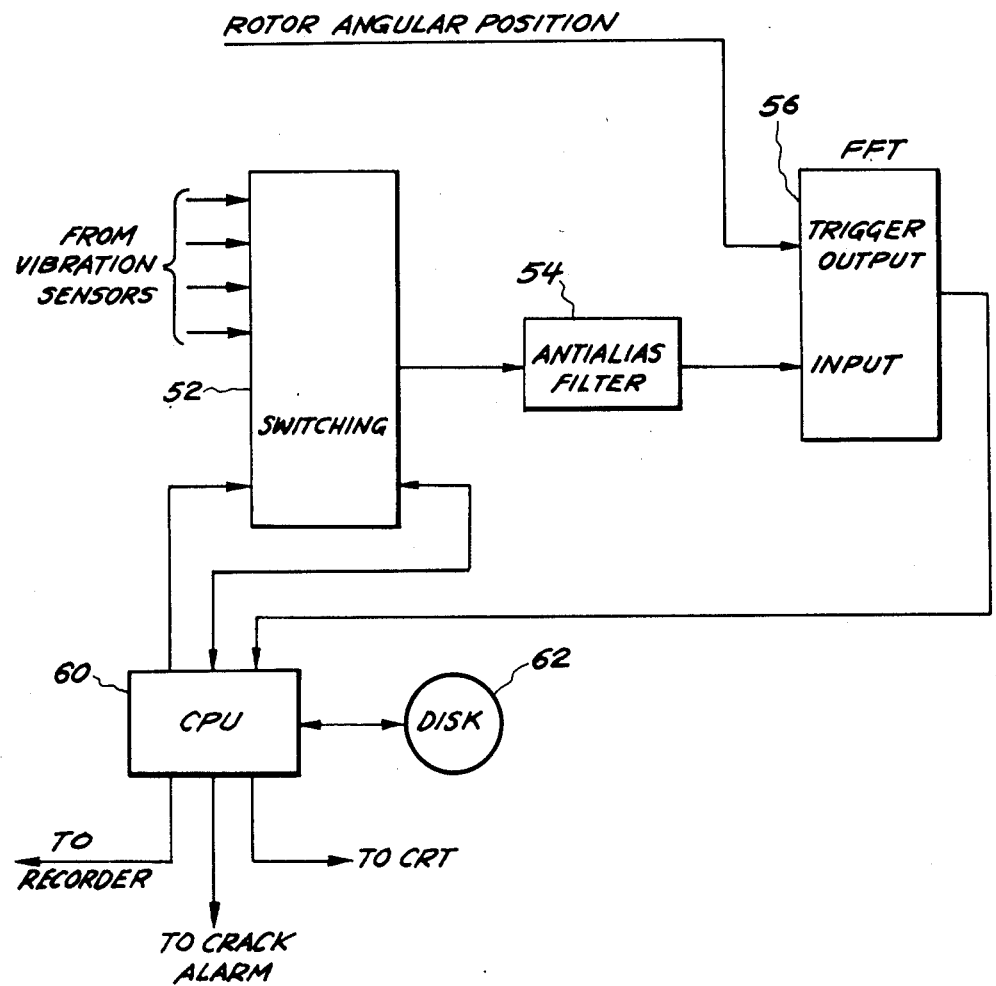
FIG. 7 is a schematic in block diagram form of the microprocessor based signal analyzer of FIG. 6.

Referring now to FIG. 7 a more detailed schematic in block diagram form of microprocessor based signal analyzer 44 is shown. Multiple outputs form signal conditioner 42 coupled to a multiplexer circuit 52, which can comprise an Hewlett-Packard HP3497A, for example. The output of the multiplexing circuit 52 is coupled through an antialiasing filter 54 to a spectrum analyzer 56. Also coupled to spectrum analyzer 56 is the output from signal conditioner 39. Spectrum analyzer 56 can comprise a Hewlett-Packard D6000 waveform analyzer for example. The output of the spectrum analyzer 56 is coupled to a central processing unit 58. The central processing unit 60 is coupled to a disk 62. The central processing unit and disk can comprise Hewlett-Packard HP-1000 A600 series and HP7914, respectively. The central processing unit is coupled to a CRT 46, recorder 48 and crack alarm 50.

In operation two alternatives are possible. First the background vibration signals can be stored in the CPU and the monitored vibration signals can be sent to the CPU where the difference between the signals at different operating speeds can be obtained in the time domain. The difference signals are then sent to the spectrum analyzer where the fast Fourier transform of the difference signal is determined. The first harmonic of the difference signal can be used as a crack indicator by determining whether the first harmonic of the difference signal is proportional to fourth power of the rotational speed.

Second the background vibration signal to be used as a baseline is coupled to the spectrum analyzer where digital amplitude and phase information for the first harmonic obtained at different operating speeds is obtained and stored on the disk. The monitored vibration signals are also coupled to the spectrum analyzer and the digital amplitude and phase information at different operating speeds is obtained and sent to the disk. Vector subtraction is performed for the first harmonics of the background and monitored signals at different operating frequencies. The difference between the first harmonics is used as a crack indicator by determining whether the difference is proportional to the fourth power of the rotational speed.

The results from signal analyzer 44 may be displayed on cathode ray tube (CRT) readout 46, and they may be provided in permanent, hard-copy format by graphic recorder 48. CRT readout 46 and graphic recorder 48 may each be employed to present the type of signal analysis results as are illustrated in FIGS. 3, 4 and 5. Furthermore, crack alarm 50 may also be provided to announce the existence of an axial crack in the rotor assembly, should the signal analysis of the present invention indicate that one has developed. Crack alarm 50 may comprise a conventional type of audio, visual, or audio-visual device, and may be made responsive to a difference signal which is greater in amplitude than a preselected value.

In FIG. 6, signal analyzer 44 has been shown as comprising a stored-program, microprocessor-based signal analyzer. However, the present invention may also employ other types of signal analyzers. The signal processing techniques required for the present invention, including programming of a microprocessor-based signal analyzer such as an analyzer 44 shown in FIG. 6, are known in the art and are readily achievable by practitioners having knowledge of the procedures described herein.

In one embodiment of the present invention, the vibration signals from vibration sensors 38 and 40 are continuously monitored, in order to provide substantially continuous detection of axial cracks in the rotor assembly. Signal analyzer 44 continually repeats the steps of providing the monitor vibration signal, vectorially subtracting the background vibration signal from the monitor vibration signal, and determining the relationship between the first harmonic difference signal and the rotational speed of the rotor assembly. By continuously monitoring the rotor assembly in this manner, rotor cracks are detected at a very early stage. Furthermore, using this embodiment of the invention, any cracks that do develop may be monitored. An increase in the above-described speed-dependent difference signal, with the passage of time, is indicative of the growth and propagation of an axial crack in the rotor assembly.

To improve the signal-to-noise ratio of the background vibration signal and the monitor vibration signal employed in the present invention, histogram techniques may be utilized to sum the respective signals over a number of time periods.

In the manner described above, signal analyzer 44 may further comprise means for providing and storing an enhanced background vibration signal which represents the vibration response of the rotor assembly at an earlier time. In a similar manner, an enhanced monitor vibration signal may also be provided. Alternatively, the enhanced monitor vibration signal need not be stored, but may instead be continually updated by the acquisition of real-time data from the vibration sensors. With the high rotational speeds typically employed in aircraft engines, and with the high processing speeds currently available for signal analyzers, the vibration signal data can be updated on a near real-time basis.

Figure 9:
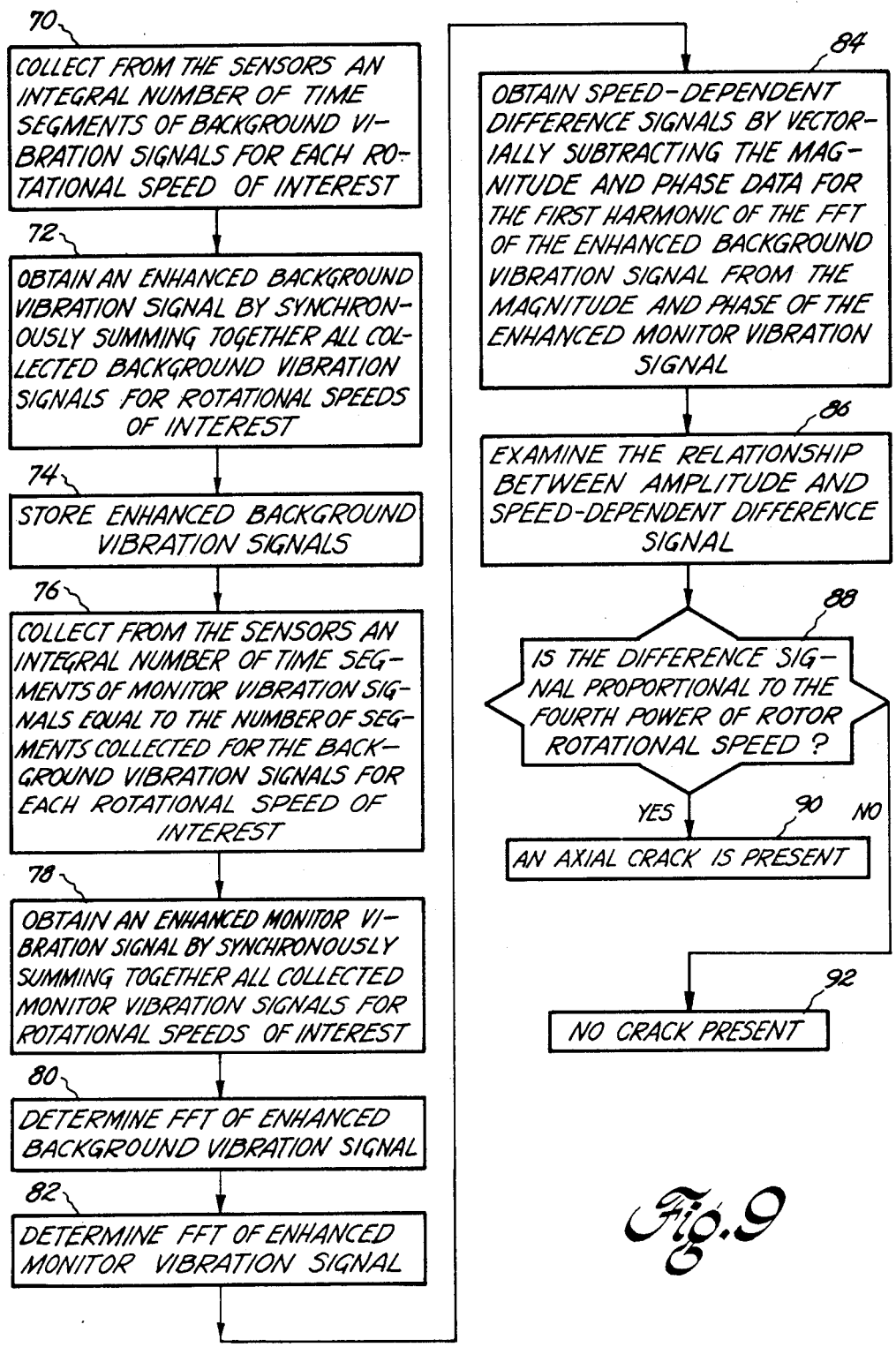
FIG. 9 is a flow chart showing the operations carried out by the microprocessor based signal analyzer in accordance with the present invention.

Thus, the signal processing involved in employing histogram techniques in the present invention may be summarized as follows, as shown in flow charge of FIG. 9. Mechanical vibrations of the rotor assembly are sensed at at least one location thereof to produce at least one time-dependent rotor vibration signal. At least one enhanced background vibration signal, which represents the vibration response, as a function of rotational speed, of the rotor assembly is provided by (1) collecting an integral number of time segments of the background vibration signal for each rotational speed of interest as shown in block 70, (2) synchronously summing together all of the collected time segments of the background vibration signal, for each rotational speed of interest, by superposing each on the other in order to generate the enhanced background vibration signal as shown in block 72, and (3) storing the enhanced background vibration signal as shown in block 74. At least one enhanced monitor vibration signal, which represents the vibration response, as a function of rotational speed, of the rotor assembly at the time the monitor is obtained, is provided by (1) collecting an integral number of time segments of the monitor vibration signal for each rotational speed of interest, with the number of segments collected being equal to the number of segments collected for the background vibration signal as shown in block 76, and (2) synchronously summing together all such collected time segments of the monitor vibration signal, for each rotational speed of interest, by superposing eacn on the other in order to generate the enhanced monitor vibration signal as shown in block 78. A fast Fourier transform (FFT) is taken of the enhanced background vibration signal in block 80 and a fast Fourier transform is taken of the enhanced monitor vibration signal in block 82. A speed-dependent difference signal is provided by vectorially subtracting the magnitude and phase data for the first harmonic of the enhanced background vibration signal from the magnitude and phase data for the first harmonic of the enhanced monitor vibration signal in block 84. The relationship between the amplitude of the resulting speed-dependent difference signal and the rotational speed of the rotor is then determined for rotational speeds away from the speed at which vibrational resonance occurs in the rotor assembly as shown in block 86. A relationship in which the difference signal is proportional to the fourth power of the rotational speed is indicative of the presence of an axial crack in the rotor assembly as shown in decision block 88 and block 90. If the relationship does not exist then no crack is present as shown in block 92. Alternatively the enhanced background vibration signal can be subtracted from the enhanced monitor vibration signal and a fast Fourier transform taken of the difference. The amplitude of the resulting speed dependent signal can thus be compared to the rotational speed of the rotor. A relationship in which the difference signal is proportional to the fourth power of the rotational speed is indicative of the presence of an axial crack in the rotor assembly.

Figure 8:
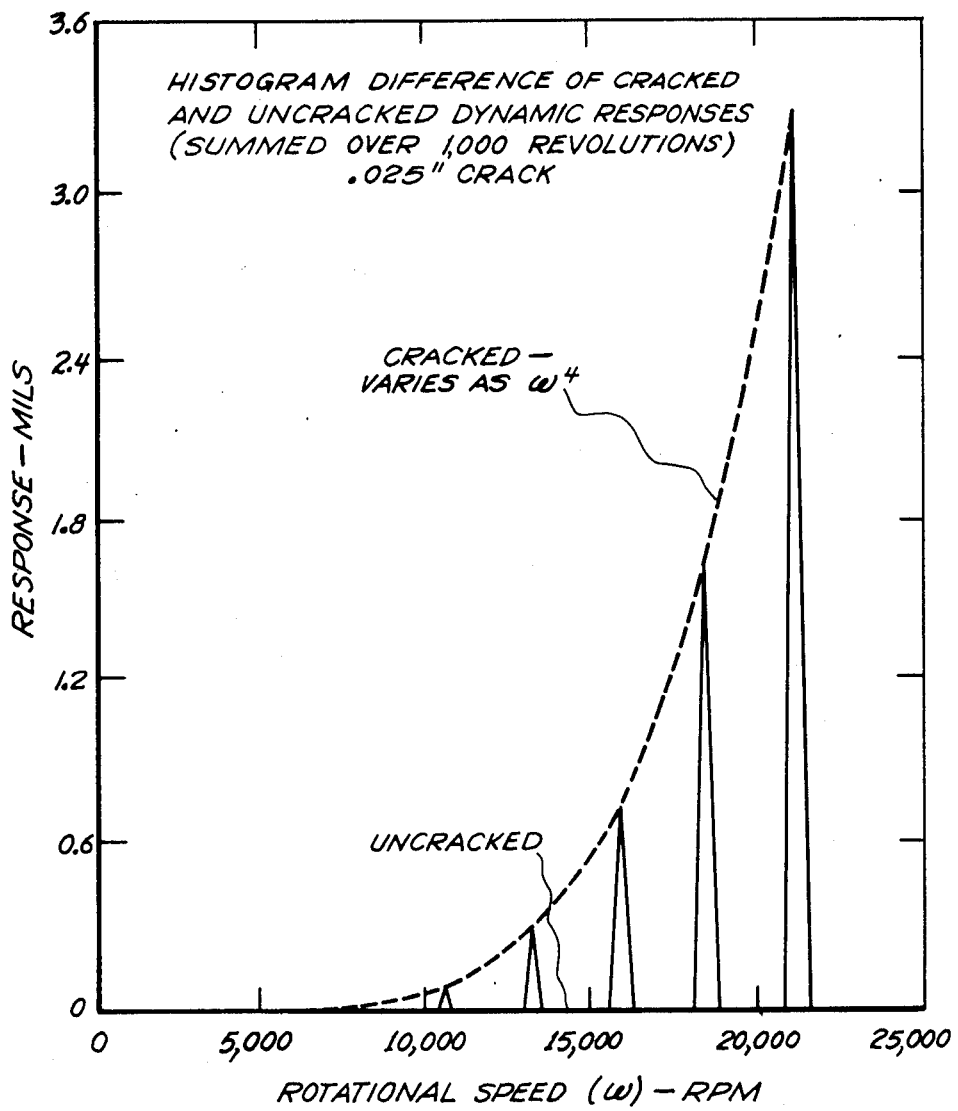
FIG. 8 illustrates the histogram difference of dynamic responses for cracked and uncracked aircraft engine rotor assemblies, in accordance with the present invention.

The present inventors have employed the histogram analysis techniques described hereinabove to perform a parametric analysis of a spin test system for a 0.025 inch crack, in accordance with the procedures of the present invention. The analysis results are illustrated in FIG. 8, where the histogram difference between cracked and uncracked dynamic responses is plotted as a function of rotational speed. The histogram signals were obtained using a time segment corresponding to one revolution of the rotor, with the signals being summed over 1,000 revolutions. As can be seen from FIG. 8, the histogram difference between the vibration responses of cracked and uncracked rotor assemblies is proportional to the fourth power of the rotational speed of the rotor assembly.

Similar to the embodiments of the present invention described hereinabove which do not employ histogram techniques, the embodiments which include histogram analysis techniques may provide the background vibration signal by sensing the vibration response of the rotor at an earlier point in time. Alternatively, the background vibration signal may be calculated by increasing the residual unbalance, measured at speeds below the crack-opening speed, as a function of the second power of the rotational speed. Also similar to the embodiments described hereinabove, embodiments of the present invention employing histogram techniques may use a plurality of rotor locations to sense mechanical vibrations. Also, the signal analysis may be performed by a stored-program, microprocessor-based signal analyzer. Additionally, embodiments of the invention employing histogram techniques may be configured to continuously repeat the signal processing involved, so as to provide substantially continuous detection of axial cracks in the rotor assembly. Furthermore, an increase in the histogram difference signal with the passage of time may be used to indicate the growth and propagation of the crack.

For all of the embodiments of the present invention described herein, the presence of an axial crack in the rotor assembly may be confirmed by further providing the above-described speed-dependent difference signal for rotational speeds near the speed at which vibrational resonance occurs in the rotor assembly. The speed-dependent difference signal for such speeds has an amplitude which is near zero for an uncracked rotor assembly and which increases in magnitude with increasing crack size in the manner illustrated in FIG. 6. Thus, the speed-dependent difference signal for speeds near the resonance speed may be processed in combination with the speed-dependent difference signal for speeds away from the resonance speed in order to confirm the presence of a rotor crack. For example, the difference signal for near-resonance speeds may be employed to indicate the presence of a defect, and the relationship between the amplitude of the difference signal and the rotational speed, for rotational speeds away from resonance, may be utilized to determine whether the indicated defect is an axial crack in the rotor assembly.

The foregoing describes a method and apparatus for detecting axial cracks in the rotor assembly of a variety of rotating machinery. The present invention provides detection of cracks while the rotor assembly is being rotated, utilizing vibration signature analysis techniques. The present invention also provides on-line continuous evaluation of the rotating machinery, so that cracks may be detected at an early stage and so that their growth and propagation may be continuously monitored.

While the invention has been described in detail herein in accord with certain preferred embodiments thereof, many modifications and changes therein may be effected by those skilled in the art. For example, while many of the embodiments of the present invention are directed toward detecting axial cracks in the rotor assembly of an aircraft engine, it should be understood that the invention is not limited to such applications. Accordingly, it is intended by the appended claims to cover all such modifications and changes as fall within the true spirit and scope of the invention.

What is claimed is:

1. A method for detecting axial cracks in the rotor assembly of rotating machinery, while the rotor is being rotated, said method comprising:
   (a) providing background vibration signal which represents the vibration response, as a function of rotational speed, of said rotor to serve as a baseline;
   (b) monitoring mechanical vibrations of said rotor at at least one location thereof to produce corresponding rotor vibration signal;
   (c) providing a signal proportional to the first harmonic of said motor vibration signal obtained from monitoring mechanical vibrations;
   (d) providing signals proportional to the first harmonic of said background vibration response signal;
   (e) generating a speed dependent first harmonic difference signal by vectorially subtracting the first harmonic of the background vibration signals from the first harmonic of said monitor vibration signals; and
   (f) determining the relationship between the amplitude of said speed-dependent difference signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

2. The method of claim 1 wherein said step of providing said background vibration signal comprises:
   determining the magnitude and phase of the residual unbalance in the rotor assembly by sensing the mechanical vibrations of said rotor at rotational speeds below the speed at which the crack opening area of an axial crack in said rotor increases; and
   calculating said background vibration signal of said rotor, as a function of rotational speed, by increasing said residual unbalance as a function of the second power of said rotational speed.

3. The method of claim 1 wherein steps (b) and (d) through (f) are continuously repeated to provide substantially continuous detection of axial cracks in said rotor.

4. The method of claim 3 wherein an increase in said speed-dependent difference signal with the passage of time is indicative of the growth and propagation of an axial crack in said rotor.

5. The method of claim 1 further comprising processing said speed-dependent difference signal for rotational speeds near the speed at which vibrational resonance occurs in said rotor, in combination with the determination of step (f), to confirm the presence of an axial crack in said rotor.

6. A method for detecting axial cracks in the rotor assembly of rotating machinery, while the rotor is being rotated, said method comprising:
   (a) providing at least one enhanced background vibration signal which represents the vibration response, as a function of rotational speed, of said rotor said enhanced background vibration signal being obtained and processed by
      (a1) collecting an integral number of time segments of said background vibration signal for each rotational speed of interest.
      (a2) generating said enhanced background vibration signal by synchronously summing together all such collected time segments of said background vibration signal, for each rotational speed of interest, by superposing each on the other, and
      (a3) storing said enhanced background vibration signal;
   (b) sensing mechanical vibration of said rotor to produce at least one time dependent enhanced monitor vibration signal which represents the vibration response, as a function of rotational speed, of said rotor at the time said monitor vibration signal is sensed, said enhanced monitor vibration signal being obtained and processed by
      (b1) collecting an integral number of time segments of said monitor vibration signal for each rotational speed of interest, with the number of segments collected being equal in number to the number of segments collected in step (a1), and
      (b2) generating said enhanced monitor vibration signal by synchronously summing together all such collected time segments of said monitor vibration signal, for each rotational speed of interest, by superposing each on the other;
   (c) providing a speed-dependent signal proportional to the first harmonic of said enhanced background vibration signal;
   (d) providing a speed-dependent signal proportional to the first harmonic of said enhanced monitor vibration signal;
   (e) providing at least one speed-dependent first harmonic difference signal by vectorially subtracting the first harmonic enhanced background vibration signal from the first harmonic enhanced monitor vibration signal; and
   (f) determining the relationship between the amplitude of said speed-dependent difference signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

7. The method of claim 6 wherein said step of providing said enhanced background vibration signal comprises:
   determining, according to steps (a1) and (a2), the magnitude and phase of the residual unbalance in the rotor assembly, by sensing the mechanical vibrations of said rotor at rotational speeds below the speed at which the crack opening area of an axial crack in said rotor increases; and
   calculating said enhanced background vibration signal of said rotor, as a function of rotational speed, by increasing said residual unbalance as a function of the second power of said rotational speed.

8. The method of claim 6 wherein steps (b) and (d) through (e) are continuously repeated to provide substantially continuous detection of axial cracks in said rotor.

9. The method of claim 8 wherein an increase in said speed-dependent difference signal with the passage of time is indicative of the growth and propagation of an axial crack in said rotor.

10. Apparatus for detecting axial cracks in the rotor assembly of rotating machinery, while the rotor is being rotated, said apparatus comprising:
    at least one vibration sensor, disposed so as to monitor mechanical vibrations of said rotor at at least one location thereof, and so as to produce rotor vibration signal in response to said mechanical vibrations;
    means for providing at least one background vibration signal which represents the vibration response, as a function of rotational speed, of said rotor which can be used as a baseline signal;
    means for processing said rotor vibration signal and said background signal so as to provide the first harmonic of the monitor vibration signal and the background vibration signal;
    means for vectorially subtracting said first harmonic background vibration signal from said first harmonic monitor vibration signal, so as to provide a speed-dependent first harmonic difference signal; and
    means for determining the relationship between the amplitude of said speed-dependent difference signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

11. The apparatus of claim 10 wherein said means for providing said background vibration signal comprises:
    means for processing said rotor vibration signal so as to determine the magnitude and phase of the residual unbalance in the rotor assembly at rotational speeds below the speed at which the crack opening area of an axial crack in said rotor increases; and
    means for calculating said background vibration signal of said rotor, as a function of rotational speed, by increasing said residual unbalance as a function of the second power of said rotational speed.

12. The apparatus of claim 10 wherein said means for providing said background signal, said means for providing said monitor signal, said means for subtracting said background signal from said monitor signal, and said means for determining the relationship between said difference signal and the rotational speed of said rotor comprise a stored-program microprocessor-based signal analyzer.

13. The apparatus of claim 10 further comprising means for processing said speed-dependent difference signal for rotational speeds near the speed at which vibrational resonance occurs in said rotor, in combination with said relationship between said difference signal and the rotational speed of said rotor for rotational speeds away from resonance, so as to confirm the presence of an axial crack in said rotor.

14. The apparatus of claim 10 further comprising:
    means for collecting an integral number of time segments of said background vibration signal and of said monitor vibration signal, respectively, for each rotational speed of interest;
    means for synchronously summing together all such collected time segments of said background vibration signal and of said monitor vibration signal, respectively, for each rotational speed of interest, by superposing each on the other so as to generate an enhanced background vibration signal and an enhanced monitor vibration signal, respectively; and
    means for storing said enhanced background vibration signal.

15. A method for detecting axial cracks in the rotor assembly of rotating machinery, while the rotor is being rotated, said method comprising:
    (a) providing background vibration signals which represents the vibration response, as a function of rotational speed, of said rotor in an uncracked condition;
    (b) monitoring mechanical vibrations of said rotor at least one location thereof to produce corresponding rotor vibration signals;
    (c) subtracting the background vibration signals from the monitored vibration signals to obtain difference signals at different operating frequencies;
    (d) determining a speed-dependent first harmonic signal of the difference between the background and monitored vibration signals; and
    (e) determining the relationship between the amplitude of said speed-dependent first harmonic signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

16. The method of claim 15 wherein said step of providing said background vibration signal comprises:
    determining the magnitude and phase of the residual unbalance in the rotor assembly by sensing the mechanical vibrations of said rotor at rotational speeds below the speed at which the crack opening area of an axial crack in said rotor increases; and
    calculating said background vibration signal of said rotor, as a function of rotational speed, by increasing said residual unbalance as a function of the second power of said rotational speed.

17. The method of claim 16 wherein an increase in said speed-dependent difference signal with the passage of time is indicative of the growth and propagation of an axial crack in said rotor.

18. The method of claim 15 further comprising processing said speed-dependent first harmonic of the difference signal for rotational speeds near the speed at which vibrational resonance occurs in said rotor, in combination with the determination of step (e), to confirm the presence of an axial crack in said rotor.

19. A method for detecting axial cracks in the rotor assembly of rotating machinery, while the rotor is being rotated, said method comprising:
(a) providing at least one enhanced background vibration signal which represents the vibration response, as a function of rotational speed, of said rotor, said enhanced background vibration signal being obtained and processed by
   (a1) collecting an integral number of time segments of said background vibration signal for each rotational speed of interest.
   (a2) generating said enhanced background vibration signal by synchronously summing together all such collected time segments of said background vibration signal, for each rotational speed of interest, by superposing each on the other, and
   (a3) storing said enhanced background vibration signal;
(b) sensing mechanical vibrations of said rotor to produce at least one time dependent enhanced monitor vibration signal which represents the vibration response, as a function of rotational speed, for said rotor at the time said monitor vibration signal is sensed, said enhanced monitor vibration signal being obtained and processed by
   (b1) collecting an integral number of time segments of said monitor vibration signal for each rotational speed of interest, with the number of segments collected being equal in number to the number of segments collected in step (a1), and
   (b2) generating said enhanced monitor vibration signal by synchronously summing together all such collected time segments of said monitor vibration signal, for each rotational speed of interest, by superposing each on the other;
(c) subtracting the enhanced background vibration signals from the enhanced monitored vibration signals to obtain difference signals at different operating frequencies;
(d) determining a speed-dependent first harmonic signal of the difference between the enhanced background and enhanced monitored vibration signals; and
(e) determining the relationship between the amplitude of said speed-dependent first harmonic signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

20. The method of claim 19 wherein said step of providing said enhanced background vibration signal comprises:
determining, according to steps (a1) and (a2), the magnitude and phase of the residual unbalance in the rotor assembly, by sensing the mechanical vibrations of said rotor at rotational speeds below the speed at which the crack opening area of an axial crack in said rotor increases; and
calculating said enhanced background vibration signal of said rotor, as a function of rotational speed, by increasing said residual unbalance as a function of the second power of said rotational speed.

21. The method of claim 19 wherein steps (b) through (e) are continuously repeated to provide substantially continuous detection of axial cracks in said rotor.

22. The method of claim 21 wherein an increase in said speed-dependent difference signal with the passage of time is indicative of the growth and propagation of an axial crack in said rotor.

23. Apparatus for detecting axial cracks in the rotor assembly of rotating machinery, while the rotor is being rotated, said apparatus comprising:
at least one vibration sensor, disposed so as to monitor mechanical vibrations of said rotor at at least one location thereof, and so as to produce rotor vibration signals in response to said mechanical vibrations;
means for providing at least one background vibration signal which represents the vibration response, as a function of rotational speed, of said rotor which can be used as a baseline signal;
means for processing said rotor vibration signal and said background signal so as to provide the difference between the two as a function of rotational speed;
means for determining the first harmonic of the difference between said background vibration signal and said monitor vibration signal; and
means for determining the relationship between the amplitude of said speed-dependent first harmonic signal and the rotational speed of said rotor, for rotational speeds away from the speed at which vibrational resonance occurs in said rotor, with a relationship in which said difference signal is proportional to the fourth power of said rotational speed being indicative of the presence of an axial crack in said rotor.

24. The apparatus of claim 23 wherein said means for providing said background vibration signal comprises:
means for processing said rotor vibration signal so as to determine the magnitude and phase of the residual unbalance in the rotor assembly at rotational speeds below the speed at which the crack opening area of an axial crack in said rotor increases; and
means for calculating said background vibration signal of said rotor, as a function of rotational speed, by increasing said residual unbalance as a function of the second power of said rotational speed.

25. The apparatus of claim 23 wherein said means for providing said background signal, said means for providing said monitor signal, said means for subtracting said background signal from said monitor signal, and said means for determining the relationship between said difference signal and the rotational speed of said rotor comprise a stored-program microprocessor-based signal analyzer.

26. The apparatus of claim 23 further comprising means for processing said speed-dependent difference signal for rotational speeds near the speed at which vibrational resonance occurs in said rotor, in combination with said relationship between said difference signal and the rotational speed of said rotor for rotational speeds away from resonance, so as to confirm the presence of an axial crack in said rotor.

27. The apparatus of claim 23 further comprising:
means for collecting an integral number of time segments of said background vibration signal and of said monitor vibration signal, respectively, for each rotational speed of interest;
means for synchronously summing together all such collected time segments of said background vibration signal and of said monitor vibration signal, respectively, for each rotational speed of interest, by superposing each on the other so as to generate an enhanced background vibration signal and an enhanced monitor vibration signal, respectively; and
means for storing said enhanced background vibration signal.

* * * * *